United States Patent Office 3,333,504
Patented Aug. 1, 1967

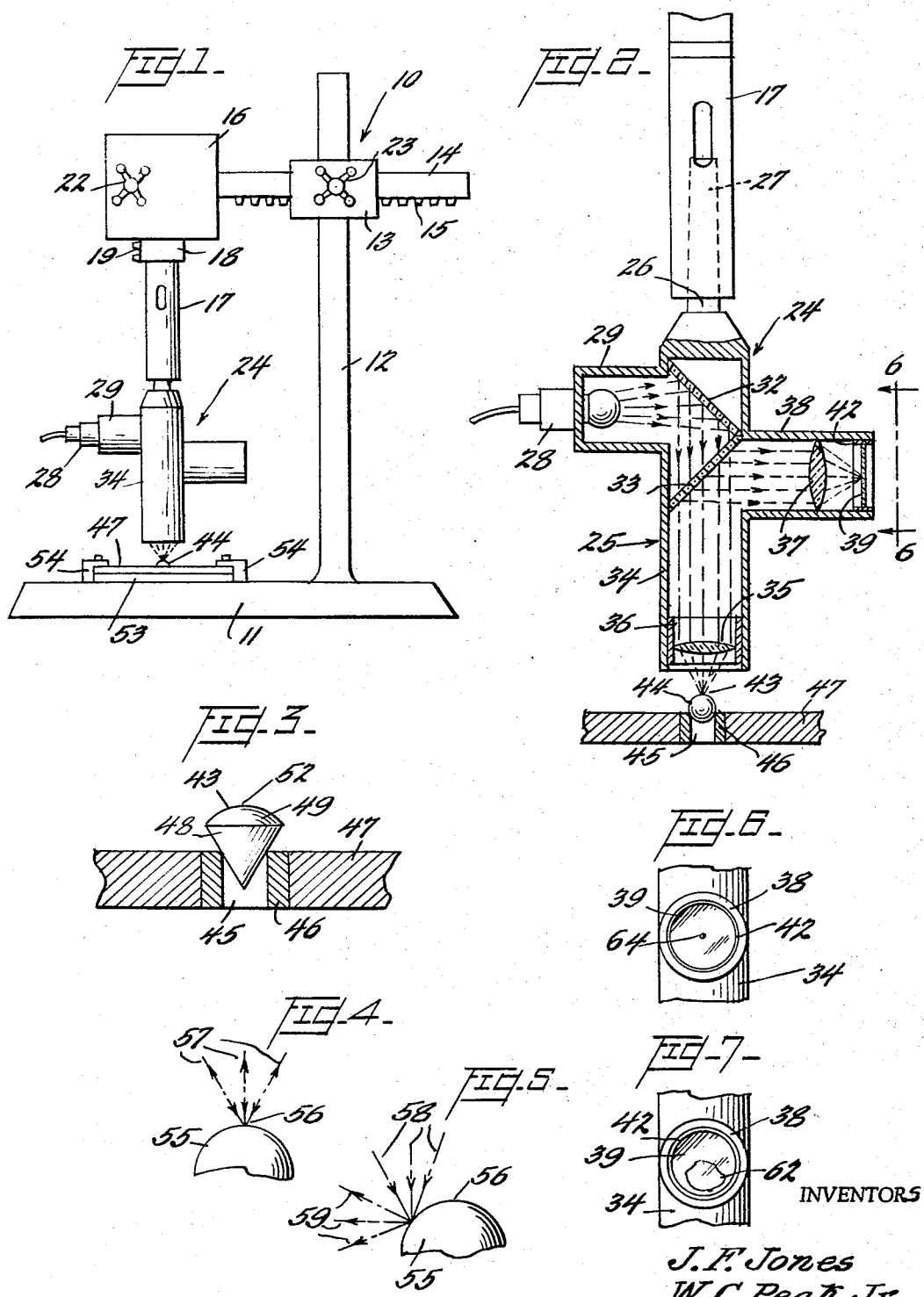

3,333,504
METHODS OF AND APPARATUS FOR LOCATING A FABRICATING TOOL RELATIVE TO A PREDETERMINED POINT
Joseph F. Jones, Salisbury, and William C. Peak, Jr., Winston-Salem, N.C., assignors to Western Electric Company, Incorporated, New York, N.Y., a corporation of New York
Filed Sept. 20, 1962, Ser. No. 225,163
4 Claims. (Cl. 88—14)

The present invention relates to methods of and apparatus for locating a fabricating tool relative to a predetermined point, and more particularly to such methods and apparatus employing an optical system to locate a chuck over a predetermined point on a workpiece or over the center of an aperture in a drill jig.

In many, perhaps most fabricating operations, it becomes necessary to locate a fabricating tool relative to a predetermined point on a workpiece or jig. For example, in the drilling of holes at precise locations in various types of workpieces, it is necessary that a drill spindle, be accurately positioned over a bushing or aperture in a drill jig or over a predetermined point on the workpiece itself. In the past, visual alignment, among other methods, has been employed and has not proved satisfactory. Complex spindle aligning apparatus has also been employed, but rendered the drilling operations expensive and time-consuming. In order to eliminate these difficulties, it is necessary that a simple method be provided for accurately locating a fabricating tool over a point on a workpiece or over the center of an aperture or bushing in a drill jig, and that a simple, inexpensive apparatus be provided for practicing the method.

It is an object of the present invention to provide new and improved methods of and apparatus for locating a fabricating tool relative to a predetermined point.

It is another object of the present invention to provide methods of and facilities for locating a chuck over the center of an aperture by reflecting a point of light from a spherical surface having a known relationship to the center of the aperture.

With these and other objects in view, the present invention contemplates a method of locating a chuck, for example a drill spindle, relative to a predetermined point on a reflective spherical surface. A point of light that is movable with the chuck is directed along the axis of the chuck to impinge as a point on the spherical surface. The position of the chuck is then adjusted until the reflection of the point of light is symmetrical with respect to the predetermined point on the spherical surface, thereby bringing the chuck and the predetermined point into alignment. The predetermined point on the spherical surface may be placed in alignment with a point on a workpiece or a point such as an aperture in a drill jig. Alignment of the chuck and the predetermined point then results in alignment of the chuck with the point on the workpiece or jig.

Additionally, with the foregoing objects in view, the present invention contemplates apparatus for directing a point of light along the axis of a chuck, such as a drill spindle, onto a predetermined point of a spherical reflective surface to align the axis of the chuck with the predetermined point. The apparatus may include, for example, a point source of light or an optical system including a source of light and a system of mirrors and lenses employed to project a point of light coincident with the axis of the chuck. The spherical surface may be in the form of a sphere, a hemisphere, or a part of a self-centering member, among other forms. Provisions may be made for securing the point source of light to the chuck and for moving the chuck relative to the spherical surface.

Also, facilities may be provided which are responsive to the point of light being reflected symmetrically with respect to the predetermined point for indicating that the axis of the chuck and the predetermined point are in alignment.

Other objects and advantages of the present invention will be apparent from the following detailed description when considered in conjunction with the accompanying drawings wherein:

FIG. 1 illustrates an optical system constructed in accordance with the principles of the present invention employed with a standard drilling machine for centering a drill spindle over an aperture in a drill jig;

FIG. 2 is an enlarged fragmentary sectional view of the optical system illustrated in FIG. 1 showing an arrangement of mirrors and lenses for projecting a beam of light converged to a point onto a self-centering member having an upper spherical surface received in an aperture of a drill jig;

FIG. 3 illustrates an alternative embodiment of the self-centering member having a tapered section received in the aperture in the drill jig and having an upper spherical surface;

FIG. 4 is a detailed view of a spherical surface indicating the reflection pattern of a point of light reflected from the uppermost point on the spherical surface;

FIG. 5 is a view of a spherical surface indicating the pattern of light diffusion when a point of light is reflected from a point spaced from the uppermost point on the spherical surface;

FIG. 6 is a view of a reticle of the optical system taken along line 6—6 of FIG. 2 showing an image of a point of light reflected from the uppermost point on a spherical surface as shown in FIG. 4; and FIG. 7 is a view of the reticle shown in FIG. 6 illustrating the appearance of diffused light resulting when a point of light is reflected from a point slightly displaced from the uppermost point on a spherical surface.

Referring first to FIG. 1, there is shown a standard drill press 10 which includes a base 11 and a shaft 12 extending vertically upward from the base. Rotatably mounted about the shaft is a support block 13 through which extends a horizontally disposed arm 14. The arm 14 has a rack 15 on its lower surface and a housing 16 supported on one extremity. The housing 16 contains a motor (not shown) which rotatably drives a chuck or drill spindle 17. The spindle 17 is positioned within a sleeve 18 and has a toothed surface 19 which engages a gear (not shown) mounted in the housing 16 for moving the spindle upward and downward upon rotation of a spoked handle 22. The housing 16 and spindle 17 are horizontally movable to the left or right upon rotation of a spoked handle 23 which rotates a gear (not shown) that engages the rack 15. The housing 16 and the spindle 17, as supported by support block 13, are movable in a circumferential path about the vertical shaft 12.

Referring now to FIG. 2, there is shown the optical system 24 including a casing generally designated as 25 from which extends a tapered shank 26 which is secured in a tapered slot 27 within the spindle 17. The optical system may be used with any of a number of machines that advance a fabricating tool along a predetermined path such as lathes and boring machines. A light source 28 is positioned in a horizontally-disposed projection 29 of the casing 25. Light emanating from the source 28 is reflected by a mirror 32 positioned at a 45° angle with respect to the horizontal to direct the light vertically downward. The light reflected from the mirror 32 passes through a semi-transparent or half mirror 33 which is also positioned at a 45° angle to the horizontal and at a 90° angle with respect to the mirror 32 into a vertical extension 34 of the casing 25. A converging lens 35 is supported in a sleeve 36 which is slidably mounted in the vertical extension 34.

The optical system 24 is so constructed that the vertical axes of the vertical extension 34 and the lens 35 are in alignment with the vertical axis of the drill spindle 17 when the tapered shank 26 is inserted in the spindle. The light rays passing through the vertical extension 34 of the casing 25 are projected from the optical system 24 through the converging lens 35. The light emerging from the lens 35 is focused to a point by adjusting the sleeve 36 or moving the optical system 24 upward or downward together with the drill spindle 17. Other optical systems capable of being moved together with a chuck of a fabricating machine and projecting a point of light in alignment with the axis of the chuck may be readily employed.

Rays of light reflected from an object positioned at the focal point of lens 35 and directed toward the vertical extension 34 of the casing 25 will pass into the vertical extension of the casing and be refracted into parallel rays by the lens. The rays are then reflected by the underside of the semi-transparent mirror 33 through a second converging lens 37 positioned in a horizontally-disposed projection 38 of the casing 25. In the embodiment shown in FIGS. 2, 6, and 7, a reticle 39 is mounted in a collar 42 which is adjustably positioned in the horizontally-disposed projection 38 and is spaced from the lens 37 so as to be illuminated by light passing through this lens. In this instance, the reticle 39 is positioned at the focal point of lens 37 so that a point of light positioned at the focal point of lens 35 will appear as a point or bright spot on the reticle; however, the reticle may be positioned on either side of the focal point of lens 37 depending upon the diameter of the bright spot desired. Furthermore, the reticle may be replaced by other types of apparatus for sensing the presence of light, such as photocell and an indicating or recording device.

In one embodiment depicted in FIG. 2, a self-centering member 43 is fabricated in the form of a polished spherical ball 44 which is positioned in an aperture 45 in a surface of a drill bushing 46 located in a drill jig 47. Because of its geometrical shape, the ball 44 centers itself in the aperture 45 with its center in vertical alignment with the axis of the aperture. In FIG. 3, there is shown an alternative embodiment of the self-centering member 43 including a conical member 48 having an upper convex spherical surface 49. The conical member 48 also centers itself in the aperture 45 due to the conical configuration. The spherical surface 49 is positioned on top of the conical member 48 such that the uppermost point 52 on the spherical surface is in alignment with the vertex of the cone and the axis of the aperture 45.

Numerous other geometrical configurations having an upper spherical surface may be used so long as the uppermost point on the spherical surface is in alignment with the direction desired to be followed by the fabricating tool.

Referring now to FIGS. 1 and 2, the method of centering the drill spindle 17 over the aperture 45 is as follows:

The shank 26 of the optical system 24 is inserted into the tapered slot 27 in the drill spindle 17. The drill jig 47 is clamped over a workpiece 53 by clamping members 54. One of the self-centering members 43 having an upper spherical surface, for example the precision ball 44, is positioned in the aperture 45 in the drill jig 47 as shown in FIG. 2. Light source 28 is energized and light is then projected through the optical system 24 toward the spherical ball 44. The drill spindle 17 is then moved horizontally, vertically, and rotatably with respect to the shaft 12 until the projected light impinges upon the spherical ball 44. The spindle 17 is then further moved and the sleeve 36 is adjusted to focus the light passing through lens 35 to a point coinciding with the uppermost point of the spherical ball 44. Such a point appears as a bright spot 64 (see FIG. 6) on the reticle 39 to indicate a centered condition.

Referring now to FIG. 4, there is shown a spherical surface 55 with a point of light being reflected from the uppermost point 56 on the surface. It is noted that the impinging light rays 57 in this instance are reflected off the spherical surface 55 symmetrically with respect to the uppermost point 56. This pattern of light reflection is achieved when the axis of the drill spindle 17 is in alignment with the axis of the aperture 45 and appears, as viewed in FIG. 6, as a bright spot 64 on the reticle 39.

In FIG. 5, light rays 58 are shown impinged upon a point of the spherical surface 55 that is laterally spaced from the uppermost point 56 of the surface. Reflected rays of light 59 are diffused and do not appear as an image on the reticle 39 since the light reflected from the surface 55 is directed away from the optical system 24. The reticle 39 in FIG. 7 illustrates a diffused pattern of reflected light 62 that appears on the article when the light rays impinge upon a point on the spherical surface 55 slightly displaced from the uppermost point 56.

It is to be understood that the above-described methods and arrangements of the apparatus and construction of elemental parts are simply illustrative of an application of the principles of the invention and many other modifications may be made without departing from the invention.

What is claimed is:

1. A method of locating the axis of a chuck in alignment with the center of a circular bore extending parallel to said chuck axis in a workpiece, comprising the steps of:

positioning a polished metal sphere having a reflective surface in the bore, said sphere having a diameter greater than the diameter of the bore, mounting a source of light in the chuck, directing a beam of light from the source along the axis of the chuck onto the spherical surface, focusing the beam of light for point reflection from the surface, converging and focusing the reflected light onto a ground glass screen, and then, moving the chuck in a direction perpendicular to the axis of the bore until the directed and focused light from the source is symmetrically reflected from the sphere and a bright symmetrical spot appears on the ground glass screen.

2. A method of locating the axis of a chuck of a fabricating tool over the center of a circular bore extending parallel to said chuck axis into a workpiece spaced from the chuck, comprising the steps of:

positioning a sphere having a highly reflective surface in said bore, said sphere having a diameter greater than the diameter of said bore, mounting a source of light to said chuck, projecting light from said source along the axis of said chuck, converging and focusing said projected light onto said reflecting surface of said sphere, converging and focusing light reflected from said sphere onto a ground glass screen, and then moving said chuck in a direction perpendicular to the axis of said bore until said projected, focused light is symmetrically reflected from said sphere and a bright symmetrical light spot appears on said ground glass screen.

3. In an apparatus for aligning the vertical axis of a movable chuck and the vertical axis of a circular bore extending into a workpiece spaced from the chuck a reflective sphere positioned in said bore, said sphere having a diameter greater than the diameter of said bore, a housing mounted to said chuck, said housing having an elongated tubular extension in coaxial alignment with said chuck, a source of light mounted in said housing, means for projecting light from said light source in a first direction along the axis of said tubular extension, a semi-transparent mirror mounted in said housing and inclined to the axis of said extension for transmitting said projected light along said first direction, said mirror being inclined to reflect light in a second direction when light impinges thereupon from a third direction which is opposite to said first direction, a first converging lens coaxially mounted in said extension for focusing light transmitted by said semi-transparent mirror to a first light spot on said sphere, said first lens converging light received from said third direction to project said received light along said third direction onto said semi-transparent mirror for reflection therefrom, a second converging lens mounted in said housing for receiving light reflected by said semi-transparent mirror along said second direction to focus said reflected light to a second light spot, the axis of said second lens crossing the axis of said first lens at the surface of said semi-transparent mirror, a ground glass screen mounted in said housing to receive said focused light from said second lens, said reflective sphere positioned in said bore for reflecting along said third direction focused light received from said first lens, and means for moving said chuck perpendicularly to said bore axis until a bright, symmetrical light spot impinges on said screen.

4. In an apparatus for aligning the parallel axes of a movable chuck spindle and a circular bore extending into a workpiece spaced from said spindle, a sphere positioned in said bore, said sphere having a reflective surface and a diameter greater than the diameter of said bore, a housing fixed to said spindle, said housing having a first elongated tubular extension in coaxial alignment with said spindle, and a second tubular extension extending from said housing at a right angle to said first tubular extension, a first converging lens coaxially mounted in said first extension for focusing light received thereat to a first light spot on the surface of said sphere, said first lens converging and projecting light reflected back to said first lens from said sphere, a second converging lens mounted in said second extension, a ground glass screen mounted in said second tubular extension at the focal point of said second lens, a source of light positioned in said housing, means for projecting light from said source along the axis of said first extension, a semi-transparent mirror mounted at a 45° angle in said extension and at the intersection of the optical axes of said first and second lenses, for transmitting light projected from said source to said first lens and for reflecting to said second lens light received from said first lens, and means for moving said spindle perpendicularly to said bore axis until a symmetrical second light spot is produced on said screen to indicate coincidence of the uppermost point of said sphere and said first light spot.

References Cited

UNITED STATES PATENTS

| | | |
|---|---|---|
| 2,146,906 | 2/1939 | Moller. |
| 2,202,222 | 5/1940 | Moller. |
| 2,402,856 | 6/1946 | Turrettini _____ 88—14 X |
| 2,466,015 | 4/1949 | Ewing. |
| 2,510,479 | 6/1950 | Poer _____ 33—46.2 X |
| 2,557,029 | 6/1951 | Griffin _____ 33—46.2 X |
| 2,684,009 | 7/1954 | Malsbary _____ 88—14 |
| 2,906,161 | 9/1959 | Thompson _____ 88—14 |

JEWELL H. PEDERSEN, *Primary Examiner.*

T. L. HUDSON, A. A. KASHINSKI,
*Assistant Examiners.*